(12) United States Patent
Olson (10) Patent No.: US 9,836,163 B2
(45) Date of Patent: Dec. 5, 2017

(54) VARIABLE PROFILE COMMON MODE FILTER

(75) Inventor: Dana Olson, Kirkland, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 3 days.

(21) Appl. No.: 13/247,727

(22) Filed: Sep. 28, 2011

(65) Prior Publication Data

US 2013/0033451 A1 Feb. 7, 2013

Related U.S. Application Data

(60) Provisional application No. 61/515,605, filed on Aug. 5, 2011.

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04107* (2013.01)

(58) Field of Classification Search
CPC ............................... G06F 3/044; G06F 3/0418
USPC .................................................. 345/173–174
See application file for complete search history.

(56) References Cited

U.S. PATENT DOCUMENTS

| | | | |
|---|---|---|---|
| 5,053,757 A | 10/1991 | Meadows | |
| 6,624,835 B2 | 9/2003 | Willig | |
| 7,692,638 B2 | 4/2010 | Land et al. | |
| 2002/0050984 A1* | 5/2002 | Roberts | 345/173 |
| 2006/0267953 A1* | 11/2006 | Peterson et al. | 345/173 |
| 2008/0142352 A1* | 6/2008 | Wright | G06F 3/044 |
| | | | 200/600 |
| 2008/0157893 A1 | 7/2008 | Krah | |
| 2008/0158179 A1 | 7/2008 | Wilson | |
| 2009/0267921 A1* | 10/2009 | Pryor | B60K 35/00 |
| | | | 345/177 |
| 2010/0079401 A1 | 4/2010 | Staton | |
| 2010/0214253 A1 | 8/2010 | Wu et al. | |
| 2011/0115729 A1 | 5/2011 | Kremin et al. | |
| 2011/0157067 A1 | 6/2011 | Wagner et al. | |
| 2011/0157077 A1 | 6/2011 | Martin et al. | |
| 2011/0163992 A1 | 7/2011 | Cordeiro et al. | |
| 2012/0050176 A1* | 3/2012 | Chin | 345/173 |
| 2012/0182252 A1* | 7/2012 | Brosnan et al. | 345/174 |
| 2012/0206399 A1* | 8/2012 | Wang | G06F 3/044 |
| | | | 345/174 |

FOREIGN PATENT DOCUMENTS

| | | |
|---|---|---|
| CN | 101185055 A | 5/2008 |
| JP | 2010-277152 A | 12/2010 |
| JP | 2010277152 A | 12/2010 |

(Continued)

OTHER PUBLICATIONS

International Search Report for International Application No. PCT/US11/53478 dated Aug. 31, 2012; 3 pages.

(Continued)

*Primary Examiner* — Kwin Xie
(74) *Attorney, Agent, or Firm* — Morgan, Lewis & Bockius LLP (57) ABSTRACT

A method and apparatus to remove direct coupled noise caused by a contact between a touch object and a capacitive sense array.

18 Claims, 7 Drawing Sheets

(56) References Cited

FOREIGN PATENT DOCUMENTS

| KR | 2011-0026765 A | 3/2011 |
|---|---|---|
| KR | 20110026765 A | 3/2011 |

OTHER PUBLICATIONS

Written Opinion of the International Searching Authority for International Application No. PCT/US11/53478 dated Aug. 31, 2012; 4 pages.
Hrvoje Benko, "Precise Selection Techniques for Multi-Touch Screens", Department of Computer Science, Columbia University; 10 pages.
Jayashree Subrahmonia, "Pen Computing: Challenges and Applications", IBM Thomas J Watson Research Center, USA, 7 pages.
Cypress Semiconductor Corporation, International Search Report and Written Opinion, PCT/US2011/053478, dated Aug. 31, 2012, 7 pgs.
Cypress Semiconductor Corporation, International Preliminary Report on Patentability, PCT/US2011/053478, dated Feb. 11, 2014, 5 pgs.

\* cited by examiner

VARIABLE PROFILE COMMON MODE FILTER

RELATED APPLICATIONS

This application claims the benefit of U.S. Provisional Application No. 61/515,605, titled "Variable Profile Common Mode Filter for Capacitance Sensing," filed on Aug. 5, 2011, the contents of which are hereby incorporated by reference herein.

TECHNICAL FIELD

This disclosure relates to the field of touch-sensing devices and, in particular, to capacitive-sensing devices.

BACKGROUND

Computing devices, such as notebook computers, personal data assistants (PDAs), mobile communication devices, portable entertainment devices (such as handheld video game devices, multimedia players, and the like) and set-top-boxes (such as digital cable boxes, digital video disc (DVD) players, and the like) have user interface devices, which are also known as human interface devices (HID), that facilitate interaction between the user and the computing device. One type of user interface device that has become more common is a touch-sensing device that operates by way of capacitance sensing. A touch-sensing device usually is in the form of a touch-sensor pad, a touch-sensor slider, or touch-sensor buttons, and includes an array of one or more capacitive sense elements (e.g., a capacitive sense array). The capacitance detected by one or more capacitance sensors changes as a function of the proximity of a touch object to the touch sensor. The touch object can be, for example, a stylus or a user's finger.

One type of capacitance sensing device includes multiple touch sense electrodes arranged in rows and columns and forming an array of intersections. At each intersection of the electrodes in the X and Y axes (i.e., a location where the approximately orthogonal electrodes cross over, but do not connect with, one another), a mutual capacitance is formed between the electrodes thus forming a matrix of capacitive sense elements. This mutual capacitance is measured by a processing system and a change in capacitance (e.g., due to the proximity or movement of a touch object) can be detected. In a touch-sensing device, a change in capacitance of each sense element in the X and Y axes of the touch sense array can be measured by a variety of methods. Regardless of the method, usually an electrical signal representative of the capacitance of the capacitive sense elements is measured and processed by a processing device, which in turn produces electrical or optical signals representative of the position of one or more touch objects in relation to the touch-sensor pad in the X and Y axes. A touch-sensor strip, slider, or button may operate on the same or another capacitance-sensing principle.

A touch-sensing device may be coupled to and/or affected by one or more sources of noise, such as an external power supply coupled to the touch-sensing device. These sources of noise may produce noise in the touch-sensing device when a touch object comes into contact with the touch-sensing device and the touch object completes a circuit connection between the noise source (e.g., an external power supply) and the touch-sensing device. The noise caused by the contact between a touch object and the touch-sensing device may be referred to as direct coupled noise. The direct coupled noise caused by the contact between a touch object and touch-sensing device may affect the capacitance measured by processing device. This may affect the ability of the processing device to detect contacts between the touch object and the touch-sensing device.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to remove (e.g., filter out) direct coupled noise caused by a contact between a touch object and a sensing device, such as a touch-sensing device. In one embodiment, the direct coupled noise may be caused when the touch object completes a circuit connection between the touch-sensing device and a noise source, such as a charging device. In one embodiment, the method includes obtaining a noise estimate of the direct coupled noise, based on capacitance values representing the contact between the touch object and the touch-sensing device. The capacitance values representing the contact may be adjusted based on the noise estimate, to remove (e.g., filter out) some or substantially all of the direct coupled noise, caused by the contact. In one embodiment, the noise estimate is subtracted from the capacitance values in order to remove the direct coupled noise. In another embodiment, a threshold value for the noise estimate may be used. For example, the noise estimated may be limited to be less than or equal to the threshold value.

Figure 1:
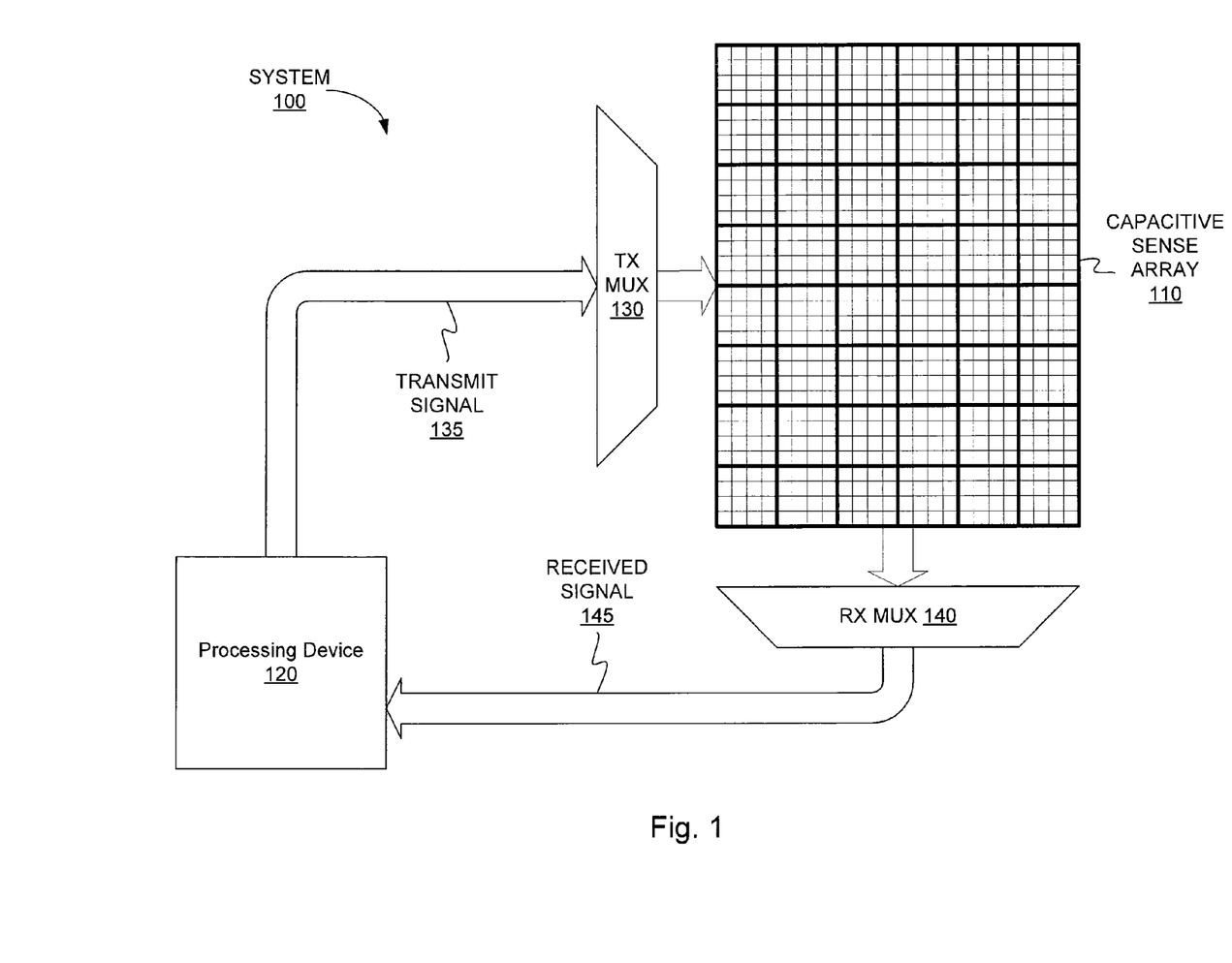
FIG. 1 is a block diagram illustrating a capacitance sensing system, according to an embodiment.

FIG. 1 is a block diagram illustrating a capacitance sensing system 100, according to one embodiment. In one embodiment, system 100 includes capacitive sense array 110, processing device 120, and multiplexers 130, 140. Capacitive sense array 110 may be part of, for example, a touch-sensing device, such as a touch-sensor pad, a touch-screen display, a touch-sensor slider, a touch-sensor button, or other device. Capacitive sense array 110 may include a matrix of sense elements arranged in rows and columns (e.g., in the X and Y axes) that can be used to detect the proximity or physical contact of a touch object (e.g., a user's finger). In one embodiment, processing device 120 uses a mutual capacitance sensing technique to measure capacitive sense array 110, where a mutual capacitance is present where each transmit electrode crosses each receive electrode. The magnitude of change in this mutual capacitance at one or more intersections allows processing device 120 to determine the approximate location of the touch object.

With mutual capacitance sensing, one set of electrodes (e.g., the rows oriented parallel to the X axis) are designated as transmit (TX) electrodes. The transmit electrodes are driven with an electronic signal 135 (e.g., transmit signal) provided by processing device 120. In one embodiment, transmit multiplexer (TX MUX) 130 may be used to apply the electronic signal 135 to one or more of the transmit electrodes. Another set of electrodes (e.g., the columns oriented parallel to the Y axis) are designated as receive (RX) electrodes. The mutual capacitance between the driven rows and columns may be measured by sampling a signal on each of the receive electrodes. In one embodiment, receive multiplexer (RX MUX) 140 may be used to couple the signal received on one or more of the receive electrodes and provide the received signal 145 back to processing device 120 for measurement. Transmit multiplexer 130 and receive multiplexer 140 may be used to logically group the electrodes in capacitive sense array 110. The designation of rows and columns as transmit and receive electrodes is merely one example, and in other embodiments, the rows and columns may be reversed. In a further embodiment, the allocation of transmit and receive electrodes may be dynamic in nature, such that for one measurement an electrode may be used as a transmit electrode, and in a following measurement it may be used as a receive electrode.

In one exemplary embodiment, processing device 120 may be the Programmable System on a Chip (PSoC®) processing device, developed by Cypress Semiconductor Corporation, San Jose, Calif. Alternatively, processing device 120 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Processing device 120 may communicate with an external component, such as a host processor (not show in FIG. 1), via host interface (I/F) (not shown in FIG. 1).

It should be noted that any one of various methods for measuring capacitance may be used. These methods include, but are not limited to, relaxation oscillator methods, current versus voltage phase shift measurement, resistor-capacitor charge timing, capacitive bridge divider, charge transfer, successive approximation, sigma-delta modulation, charge-accumulation circuits, field effect, mutual capacitance, frequency shift, or the like. Accordingly, a detailed description of these capacitance sensing methods is not included so as not to obscure the present invention.

It should also be noted that the components of capacitance sensing system 100 may include all the components described above. Alternatively, capacitance sensing system 100 may include only some of the components described above, or include additional components not listed herein.

Figure 2:
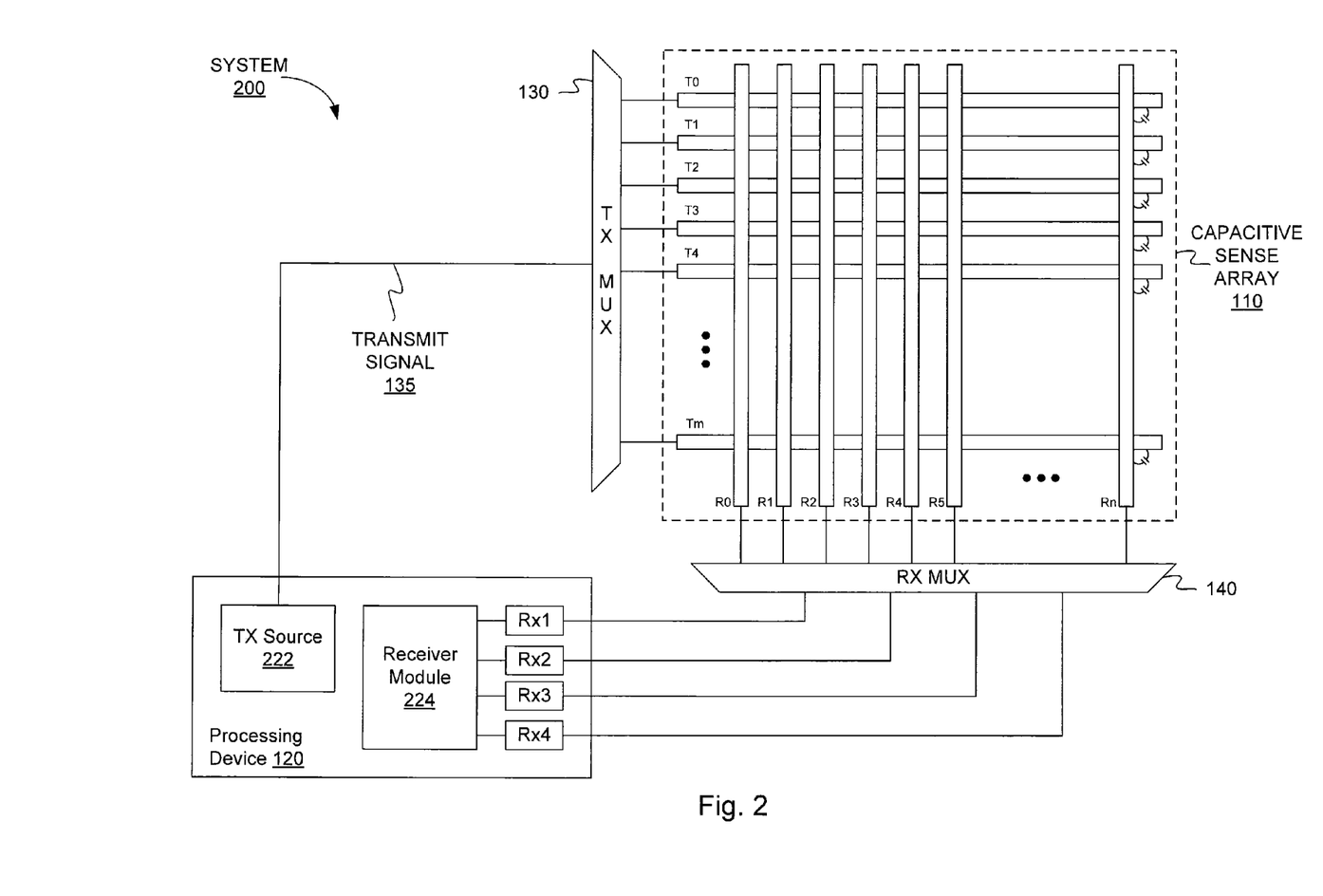
FIG. 2 is a block diagram illustrating a capacitance sensing system, according to an embodiment.

FIG. 2 is a block diagram illustrating a capacitance sensing system 200, according to one embodiment. In one embodiment, system 200 includes capacitive sense array 110, processing device 120, and multiplexers 130, 140, as described above with respect to FIG. 1. In capacitive sense array 110, individual transmit electrodes T0-Tm and receive electrodes R0-Rn are shown. In different embodiments, there may be any number of transmit and receive electrodes in capacitive sense array 110.

Each of transmit electrodes T0-Tm may be connected to transmit multiplexer 130, which controls application of transmit signal 135. Transmit multiplexer 130 may selectively apply transmit signal 135 to one or more of transmit electrodes T0-Tm based on a control signal (not shown). The control signal may be received from processing device 120 or from some other source. Transmit multiplexer 130 may apply transmit signal 135 to (i.e., drive) a select number of transmit electrodes at a time (e.g., T0-T3). These transmit electrodes that are driven together may form the X-axis component of capacitive sense array 110. The transmit electrodes may be driven sequentially (i.e., one at a time) with the transmit signal 135, or a select number may be driven at the same time. The number of transmit electrodes driven at one time may also be based on electrical considerations of capacitive sense array 110 and processing device 120, such as the level of charge that receive electrodes R0-Rn can handle, or the maximum charge that the transmit signal 135 may provide. In one embodiment, transmit signal 135 is provided by transmit source component 222 of processing device 120, however in other embodiments, transmit signal 135 may be provided by some other source. In some embodiments, transmit source component 222 may drive multiple transmit electrodes with a transmit signal 135 having multiple phases, frequencies or amplitudes.

Each of receive electrodes R0-Rn may be connected to receive multiplexer 140, which controls the application of receive signals to processing device 120 for measurement and processing. In one embodiment, processing device 120 includes receiver module 224. Receiver module 224 may couple to a number of receive channels Rx1, Rx2, Rx3, Rx4, each of which is configurable to measure and process a receive signal from one or more of receive electrodes R0-Rn. In other embodiments, there may some other number of receive channels. In certain embodiments, however, the number of receive channels may be less than the number of receive electrodes, thus preventing all receive electrodes from being measured at once. Receive multiplexer 140 may selectively apply receive signals from a number of receive electrodes (e.g., R0-R3) to one receive channel (e.g., Rx1) for measurement based on a control signal (not shown). The control signal may be received from processing device 120 or from some other source. These receive electrodes that are measured together may form the Y-axis component of capacitive sense array 110. Thus, if the receive signal from any of receive electrodes R0-R3 indicates the presence of a touch object, receiver module 224 will detect the presence on receive channel Rx1. In one embodiment, the receiver module 224 may include analog I/O for coupling to an external component, such as capacitive sense array 110, and/or other devices.

It should also be noted that the components of capacitance sensing system 200 may include all the components described above. Alternatively, capacitance sensing system 200 may include only some of the components described above, or include additional components not listed herein.

Figure 3:
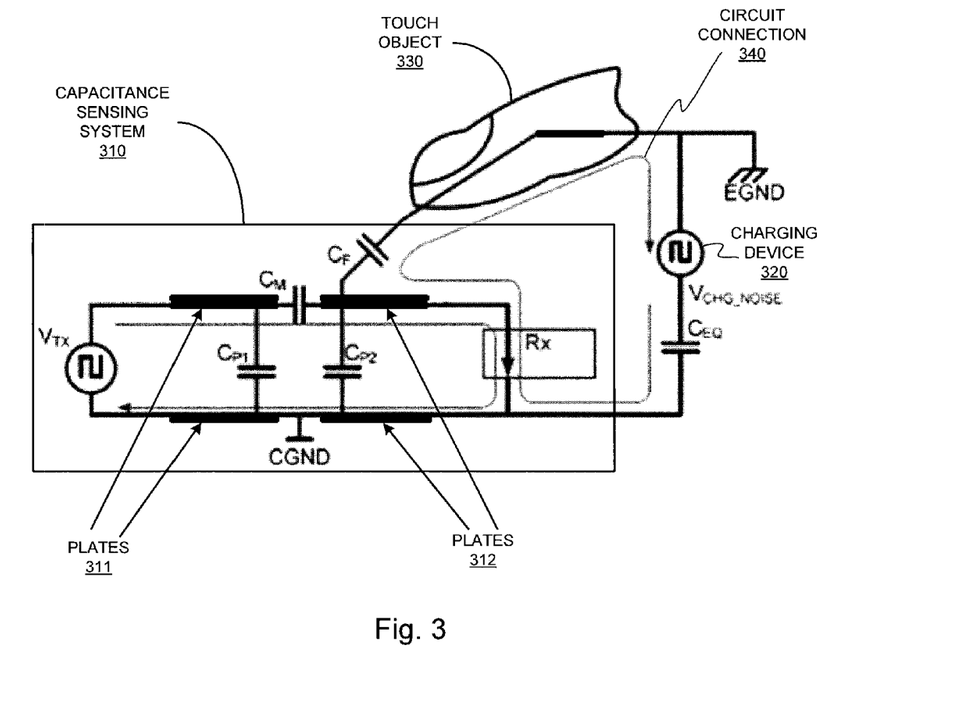
FIG. 3 illustrates a touch-sensing device coupled to a charging device, according to one embodiment.

FIG. 3 illustrates a capacitance sensing system 310 coupled to a charging device 320, according to one embodiment. Capacitance sensing system 310 comprises metal plates 311 and 312. When a touch object 330 (e.g., a finger or stylus) is placed in proximity to one of the metal plates 311 and 312, there is an effective capacitance, $C_F$, between the metal plate and the touch object 330 with respect to ground. Also, there is a capacitance, $C_M$, between the metal plates 311 and 312. Accordingly, a processing device, such as processing device 120 can measure the change in capacitance, capacitance variation $C_M$, when the touch object is in proximity to one or more of the metal plates 311 and 312. In one embodiment, a dielectric material may be positioned above and below the metal plates 311 and 312 which are closest to the touch object 330. The dielectric material may be an overlay. The overlay may be non-conductive material used to protect the circuitry from environmental elements and to insulate the touch object or substance from the circuitry. FIG. 3, by way of example, illustrates a finger to represent touch object 330, however in alternative embodiments, touch object 330 may be any conductive object or substance.

The capacitance sensing system 310 is coupled to a charging device 320 (e.g., a voltage source). In one embodiment, the charging device 320 may be used to power the capacitance sensing system 310 and/or to charge a battery or other power source coupled to the capacitance sensing system 310. When the touch object 330 comes into contact with the capacitance sensing system 310, the touch object 330 may complete a circuit connection 340 between the charging device 320 and the capacitance sensing system 310. By completing the circuit connection 340, noise generated by charging device 320 is introduced into the capacitance sensing system 310. This noised caused by the contact between the touch object 330 and the capacitance sensing system 310 may comprise direct coupled noise.

Figure 4:
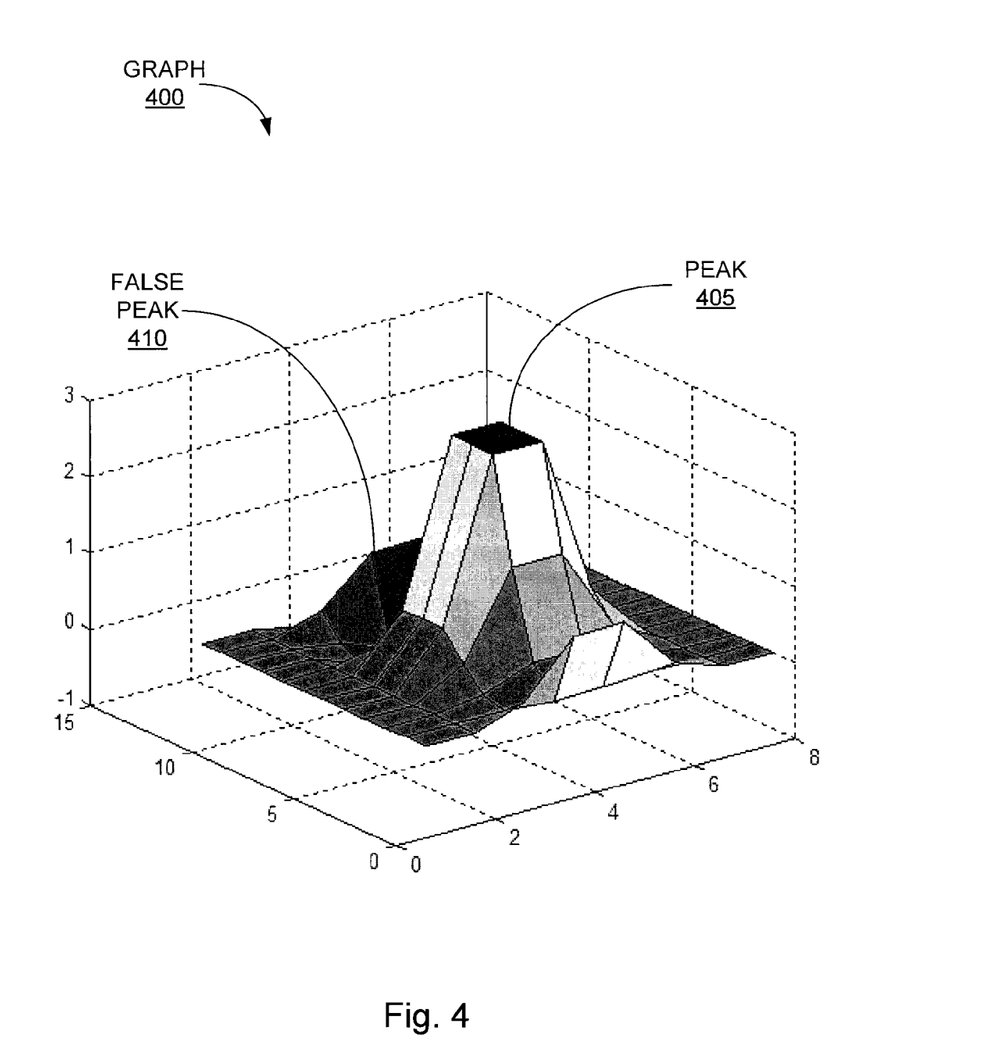
FIG. 4 is a graph illustrating capacitances measurements of a contact between a touch object and a capacitive sense array, according to one embodiment.

FIG. 4 is a graph 400 illustrating capacitance measurements of a contact between a touch object and a capacitive sense array, according to one embodiment. For the embodiment shown in graph 400, the capacitive sense array has 15 rows of electrodes and 8 columns of electrodes. The 15 rows on the Y-axis are transmit electrodes and the 8 columns on the X-axis are receive electrodes. The capacitance values for the rows and columns are shown on the Z-axis. As shown in graph 400, there are two peaks in capacitance values, peak 405 and false peak 410. Peak 405 represents the capacitance values measured for the actual contact between the touch object and the capacitive sense array. The peak 405 has an "A" shape, with the top of the peak representing the actual contact between the touch object and the touch-sensing device, and the sides representing the capacitance measured due to the proximity of the touch object with the touch-sensing device in the region surrounding the actual contact. The "A" shape of the peak 405 may also be referred to as the amplitude profile of the contact between the touch object and the touch-sensing device.

False peak 410 represents the direct coupled noise measured by the capacitive sense array resulting from the contact between the touch object and the touch-sensing device. The false peak 410 also has an "A" shape (e.g., a noise amplitude profile), similar to the peak 405. However, the false peak 410 is shorter than peak 405, due to the smaller magnitude of the capacitance values measured at the locations on the capacitive sense array where the direct coupled noise occurred. Thus, the false peak 410 may comprise a scaled version of the peak 405. In one embodiment, the direct coupled noise may occur in the same columns (e.g., the receive electrodes) where the actual contact occurs.

Figure 5:
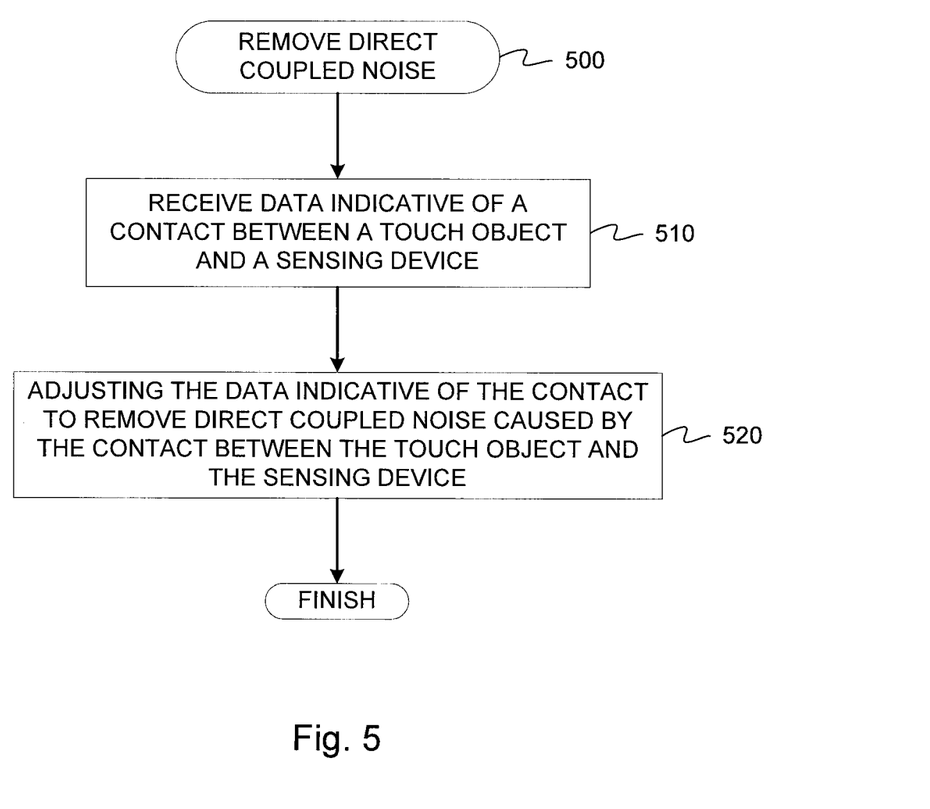
FIG. 5 is a flow diagram illustrating a method for removing direct coupled noise in a touch-sensing device, according to an embodiment.

FIG. 5 is a flow diagram illustrating a method 500 for removing direct coupled noise in a touch-sensing device, according to an embodiment. The method 500 may be performed by processing logic that comprises hardware (e.g., circuitry, dedicated logic, programmable logic, microcode), software (e.g., instructions run on a processing device to perform hardware simulation), or a combination thereof. The processing logic is configured to remove direct coupled noise caused by a contact between a touch object (e.g., finger, stylus, etc.) and the touch-sensing device. In one embodiment, method 500 may be performed by processing device 120 and multiplexers 130, 140, as shown in FIGS. 1 and 2.

Referring to FIG. 5, a touch object (e.g., finger, stylus) comes into contact with a portion of the touch-sensing device (e.g., the capacitive sense array 110 shown in FIG. 1). The capacitive sense array 110 may transmit signals and/or data indicative of the contact between the touch-sensing device and the touch object, to the processing device 120. At block 510, the processing device 120 receives the signals and/or data indicative of the contact between the touch object and the touch-sensing device.

In one embodiment, the data indicative of the contact between the touch-sensing device and the touch object may comprise a matrix of capacitance values (e.g., a set of capacitance values). The matrix of capacitance values may comprise capacitance values measured by the capacitive sense elements of the capacitive sense array 110. In one embodiment, the capacitance values in the rows of the matrix may correspond to measurements obtained at the rows of the capacitive sense array 110, and the capacitance values in the columns of the matrix may correspond to measurements obtained at the columns of the capacitive sense array. For example, the matrix the capacitive value in the first row and first column of the matrix may correspond to the capacitance measured at the intersection of row T0 and column R0 of the capacitive sense array 110.

In another embodiment, the data indicative of the contact between the touch object and the touch-sensing device may comprise two or more matrices of capacitances values (e.g., two or more sets of capacitance values). For example, the touch-sensing device may measure capacitance values received on receive electrodes R0-Rn at certain time intervals (e.g., every 10 milliseconds or every 100 milliseconds). The data indicative of the contact between the touch object and the touch-sensing device may comprise multiple measurements of the capacitance values (e.g., 2 measurements or 5 measurements) obtained at different times. In other embodiments, the data indicative of the contact between the touch-sensing device and the touch object may comprise other data structures, including, but not limited to, arrays containing capacitance values and a table of capacitance values.

At block 520, the processing device 120 adjusts the data indicative of the contact to remove (e.g., filter out) the direct coupled noise caused by the contact between the touch object and the touch-sensing device. In one embodiment, the processing device 120 may obtain an estimate of the direct coupled noise caused by the contact between the touch object and the touch-sensing device. The processing device 120 may adjust the data indicative of the contact, based on the estimate of the direct coupled noise. In one embodiment, the processing device 120 may subtract the noise estimate from the data indicative of the contact between the touch object and the touch-sensing device. For example, as discussed above, the data indicative of the contact between the touch object and the touch-sensing device may comprise a matrix of capacitance values. The capacitance values may include direct coupled noise caused by the contact between the touch object and the touch-sensing device. The noise estimate may be subtracted from the capacitance values to remove the direct coupled noise included in the capacitance values. In one embodiment, the noise estimate may also comprise a matrix. The processing device 120 may adjust the data indicative of the contact by subtracting the noise estimate from the data indicative of the contact between the touch object and the touch-sensing device, to remove the direct couple noise.

In one embodiment, a noise estimate may be computed for each matrix of capacitance values received by the processing device 120. For example, the touch-sensing device may measure capacitance values received on receive electrodes R0-Rn every 20 milliseconds. Each measurement may be represented as a matrix of capacitance values, and a noise estimate may be computed for each matrix of capacitance values.

In one embodiment, one or more components of the touch-sensing device may pre-filter the signals received by the receive electrodes R0-Rn. This pre-filtering may allow signals within a certain frequency range to pass through to other components of the touch-sensing device. In one embodiment, the direct coupled noise which is received along with signals for the actual contact may be in the same frequency range as the signals for the actual contact, due to the pre-filtering. In another embodiment, the direct coupled noise may be the same frequency as the signals for the actual contact, due to the pre-filtering.

Figure 6:
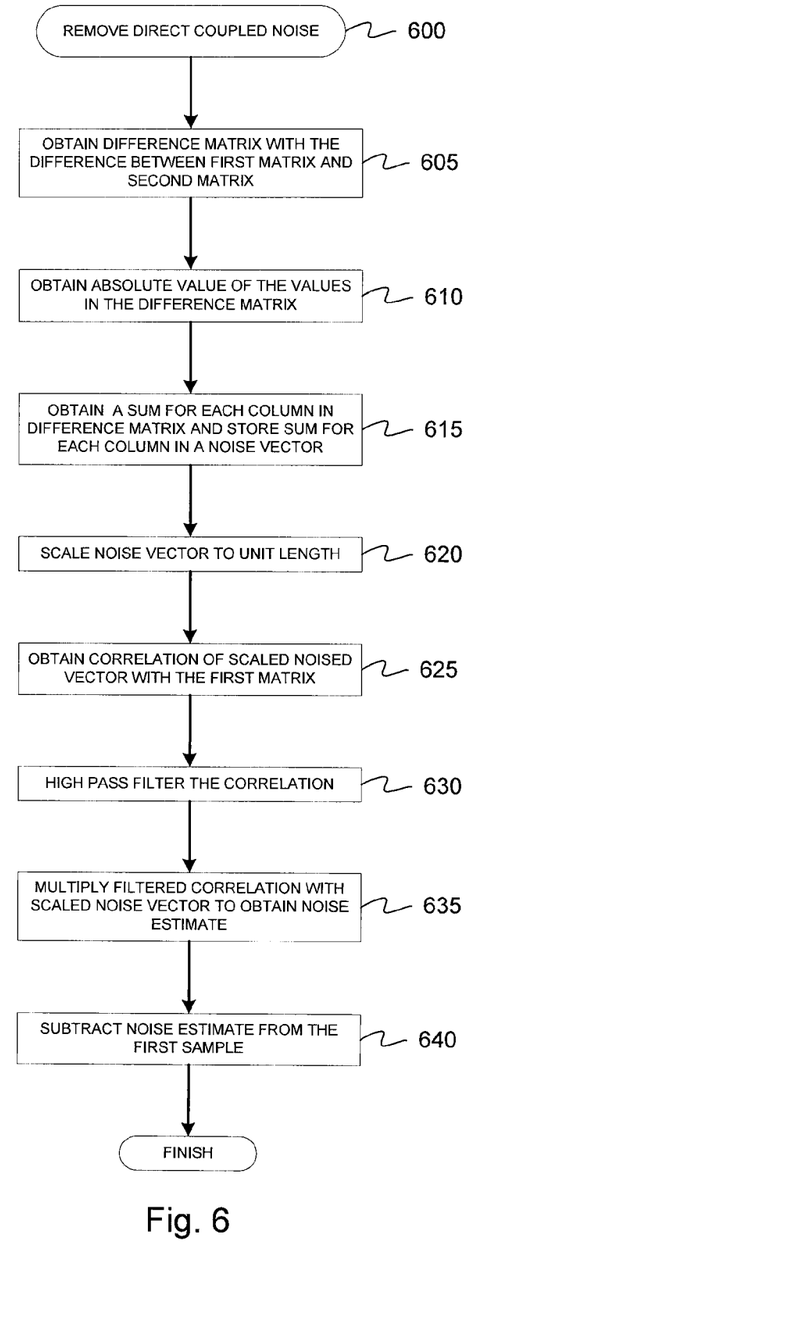
FIG. 6 is a flow diagram illustrating a method for removing direct coupled noise in a touch-sensing device, according to an embodiment.

FIG. 6 is a flow diagram illustrating a method 600 for removing direct coupled noise in a capacitive sense array, according to an embodiment. The method 600 may be performed by processing logic that comprises hardware (e.g., circuitry, dedicated logic, programmable logic, microcode), software (e.g., instructions run on a processing device to perform hardware simulation), or a combination thereof. The processing logic is configured to remove direct coupled noise caused by a contact between a touch object (e.g., finger, stylus, etc.) and the touch-sensing device. In one embodiment, method 600 may be performed by processing device 120 and multiplexers 130, 140, as shown in FIGS. 1 and 2.

Referring to FIG. 6, a touch object (e.g., finger, stylus) comes into contact with a portion of the touch-sensing device (e.g., the capacitive sense array 110 shown in FIG. 1). The capacitive sense array 110 may transmit signals and/or data indicative of the contact between the touch-sensing device and the touch object, to the processing device. In one embodiment, the data indicative of the contact may comprise two or more matrices and each matrix may comprise capacitance values for the capacitive sense array, measured at a different time. At block 605, the processing device 120 obtains a difference matrix (DiffM) with the difference between a first matrix of capacitance values (M1) and a second matrix of capacitance values (M2). In one embodiment, the first matrix of capacitance values may M1 comprise capacitance values measured at a time "t" and the second matrix of capacitance values M2 may comprise capacitance values measure at a previous time interval "t−1." Exemplary matrices M1 and M2 are illustrated in the Appendix. The processing device 120 may obtain the difference matrix DiffM by subtracting the second matrix of capacitance values M2 from the first matrix of capacitance values M1. In one embodiment, the difference matrix may be determined using the following formula:

$$\text{DiffM} = M1 - M2 \quad (1)$$

An exemplary matrix DiffM is illustrated in the Appendix.

In one embodiment, the matrices M1 and M2 may comprise average values of actual capacitance measurements obtained by the touch-sensing device (e.g., an average of the last 5 capacitance measurements). In another embodiment, the actual capacitance measurements obtained by the touch-sensing device (e.g., the last 5 capacitance measurements) may be used in the following equations, in place of matrices M1 and M2.

At block 610, the processing device 120 obtains the absolute value (AbsDiffM) of the capacitance values in the difference matrix DiffM. In one embodiment, the absolute value of the capacitance values in the difference matrix DiffM may be determined using the following formula:

$$\text{AbsDiffM} = |\text{DiffM}| \quad (2)$$

An exemplary matrix AbsDiffM is illustrated in the Appendix.

At block 615, a noise vector (noiseProfEst) is obtained by obtaining a sum for each column in AbsDiffM. For example, the first element of noise vector noiseProfEst may be the sum of all the values in the first column of AbsDiffM. An exemplary vector noiseProfEst is illustrated in the Appendix. As shown in the exemplary vector noiseProfEst shown in the Appendix, the third element 1.5311 of the vector noiseProfEst is a sum of the values 0.2503, 0.0306, 0.1127, 0.0448, 0.0508, 0.0507, 0.1785, 0.2956, 0.0984, 0.2037, and 0.1647, in column three of the exemplary matrix AbsDiffM.

After obtaining the noise vector noiseProfEst, the noise vector noiseProfEst is scaled to a unit length to obtain a scaled noise vector (noiseProfUnit) at block 620. In one embodiment, the noise vector noiseProfEst is scaled to unit length using the following formula:

$$\text{noiseProfUnit} = (1/(\text{noiseProfEst} \cdot \text{noiseProfEst}^T))*\text{noiseProfEst} \quad (3)$$

It should be noted that $\text{noiseProfEst}^T$ is the transpose of vector noiseProfEst and that "·" indicates the dot product operation. An exemplary vector noiseProfUnit is illustrated in the Appendix.

The correlation (noiseCor) between the scaled noise vector noiseProfUnit and the matrix M1 is obtained at block 625. In one embodiment, the correlation noiseCor may be determined using the following formula:

$$\text{noiseCor} = \text{noiseProfUnit} * M1^T \quad (4)$$

It should be noted that $M1^T$ is the transport of the matrix M1. An exemplary correlation vector noiseCor is illustrated in the Appendix.

At block 630, the correlation is high pass filtered to remove the steady correlated capacitance values which are due to the actual contact between the touch object and the touch-sensing device. The high pass filtering may use a filter coefficient "k." The filter coefficient k may comprise a value between 0 and 1. In one embodiment, the noise correlation may be calculated using a baseline noise correlation (noiseCorBaseline). As discussed above, a noise estimate may be obtained for each one of a plurality of matrices of capacitance values, received by the processing device 120. The baseline noiseCorBaseline may be used by each calculation of the noise estimate for each of the multiple matrices. In one embodiment, noiseCorBaseline may be a persistent value that is used and/or updated by each calculation of the noise estimate for each of the multiple matrices. In another embodiment, noiseCorBaseline may prevent the capacitance values representing the actual contact, from being filtered out along with the capacitance values representing the direct coupled noise. In a further embodiment, as the noiseCorBaseline is updated by each calculation, the updated noiseCorBaseline may be used to more accurately filter out the direct couple noise and prevent capacitance values for actual contacts from being filtered out. In one embodiment, the filtered correlation (noiseCorFilt) may be obtained using the following equations:

$$\text{noiseCorBaseline}=(1-k)*\text{noiseCorBaseline}+k*\text{noiseCor} \quad (5)$$

$$\text{noiseCorFilt}=\text{noiseCor}-\text{noiseCorBaseline} \quad (6)$$

Exemplary noiseCorBaseline and noiseCorFilt vectors are shown in the Appendix.

In one embodiment, equations (5) and (6) may not be used, and the noiseCorFilt vector may be obtained by using the median of current and one or more past values of the vector noiseCor. For example, the first element of the vector noiseCorBaseline would be computed as the median of the first element of the noiseCor vector from the most recent computation of noiseCorBaseline and the two previous computations. In another example, the first element of the vector noiseCorBaseline would be computed as the median of the first element of the noiseCor vector from the most recent computation of noiseCorBaseline and the ten previous computations.

At block 635, the filtered correlation noiseCorFilt is multiplied with the scaled noise vector noiseProfUnit to obtain a noise estimate (noiseEst). In one embodiment, the noise estimate noiseEst is obtained using the following equation:

$$\text{noiseEst}=\text{noiseCorFilt}^T*\text{noiseProfUnit} \quad (7)$$

It should be noted that noiseCorDiff$^T$ is the transpose of the vector noiseCorFilt. An exemplary noiseEst matrix is illustrated in the Appendix. In one embodiment, the noise estimate noiseEst comprises a matrix of estimated noise values. After obtaining the noise estimate noiseEst, the matrix M1 (which represents the capacitance values measured at time t) is adjusted using the noise estimate noiseEst at block 640. In one embodiment, the matrix M1 is adjusted by subtracting the noise estimate noiseEst from the matrix M1. The matrix M1 may be adjusted using the following equation:

$$M1=M1-\text{noiseEst} \quad (8)$$

In one embodiment, the touch-sensing device may not experience any delays when processing a contact between the touch object and the touch-sensing device which does not cause any direct coupled noise. As discussed above, when there is direct coupled noise caused by a contact, noiseCorBaseline may be updated each time a noise estimate is calculated and removed. During the initial calculations of equations (1) through (8), some of the capacitance values representing the actual contact may be filtered out along with the direct coupled noise. This may cause a delay in the processing of an actual contact, because capacitance values representing the actual contact may be inadvertently filtered out during the initial calculations. As more calculations are performed and as noiseCorBaseline is updated, noiseCorBaseline is able to better prevent the capacitance values representing the actual contact from being filtered out. However, in one embodiment where there is no direct coupled noise, then the calculations of equations (1) through (8) may not inadvertently remove capacitance values representing the actual contact and the processing of the actual contact may not be delayed.

Figure 7:
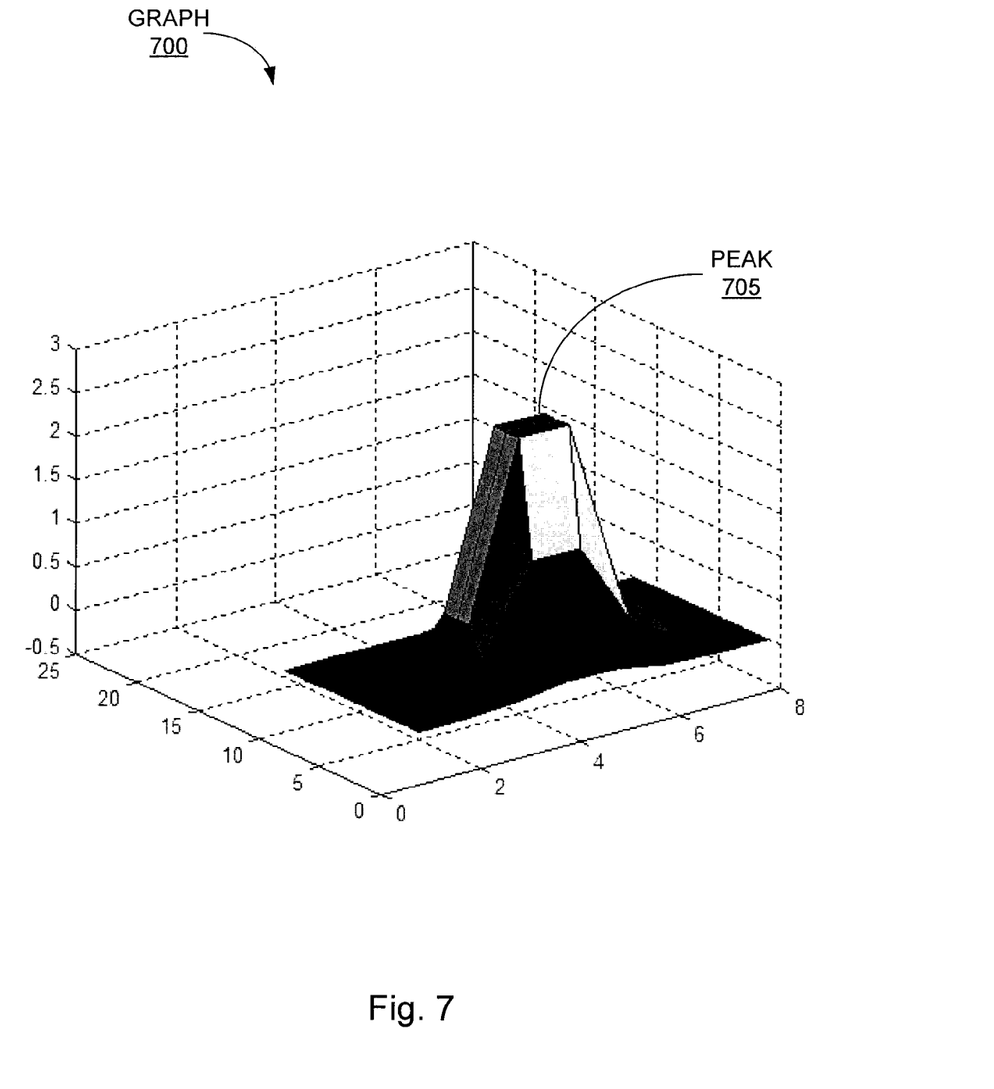
FIG. 7 is a graph illustrating capacitances measurements of a contact between a touch object and a capacitive sense array, according to one embodiment.

FIG. 7 is a graph 700 illustrating capacitance measurements of a contact between a touch object and a capacitive sense array, according to one embodiment. For the embodiment shown in graph 700, the capacitive sense array has 15 rows of electrodes and 8 columns of electrodes. The 15 rows on the Y-axis are transmit electrodes and the 8 columns on the X-axis are receive electrodes. The capacitance values for the rows and columns are shown on the Z-axis. The graph 700 represents capacitance values for the capacitive sense array after the direct coupled noise has been removed (e.g., filtered out). As shown in graph 700, there is one peak 705. Peak 705 represents the capacitance values measured for the actual contact between the touch object and the capacitive sense array. Referring back to FIG. 4, the false peak 410 representing the direct coupled noise has been removed in the graph 700 by the systems and methods described herein.

Embodiments of the present invention include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); or another type of medium suitable for storing electronic instructions. In one embodiment, the machine-readable medium may comprise a non-transitory machine-readable medium.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

APPENDIX

Matrix M1

| 0 | 0 | 0.2309 | 0.9235 | 0.9235 | 0.2309 | 0 | 0 |
|---|---|---|---|---|---|---|---|
| 0 | 0 | −0.0114 | −0.0457 | −0.0457 | −0.0114 | 0 | 0 |
| 0 | 0 | 0.0834 | 0.3335 | 0.3335 | 0.0834 | 0 | 0 |
| 0 | 0 | 0.3622 | 1.4490 | 1.4490 | 0.3622 | 0 | 0 |
| 0 | 0 | 0.7052 | 2.8209 | 2.8209 | 0.7052 | 0 | 0 |
| 0 | 0 | 0.7052 | 2.8209 | 2.8209 | 0.7052 | 0 | 0 |
| 0 | 0 | 0.7052 | 0.2809 | 2.8209 | 0.7052 | 0 | 0 |
| 0 | 0 | 0.1559 | 0.6237 | 0.6237 | 0.1559 | 0 | 0 |
| 0 | 0 | −0.2379 | −0.9518 | −0.9518 | −0.2379 | 0 | 0 |
| 0 | 0 | −0.0866 | −0.3463 | −0.3463 | −0.0866 | 0 | 0 |
| 0 | 0 | 0.2013 | 0.8050 | 0.8050 | 0.2013 | 0 | 0 |
| 0 | 0 | −0.1330 | −0.5321 | −0.5321 | −0.1330 | 0 | 0 |

Matrix M2

| 0 | 0 | −0.0194 | −0.0777 | −0.0777 | −0.0194 | 0 | 0 |
|---|---|---|---|---|---|---|---|
| 0 | 0 | 0.0191 | 0.0766 | 0.0766 | 0.0191 | 0 | 0 |
| 0 | 0 | −0.0293 | −0.1174 | −0.1174 | −0.0293 | 0 | 0 |
| 0 | 0 | 0.3175 | 1.2698 | 1.2698 | 0.3175 | 0 | 0 |
| 0 | 0 | 0.6544 | 2.6176 | 2.6176 | 0.6544 | 0 | 0 |
| 0 | 0 | 0.6545 | 2.6182 | 2.6182 | 0.6545 | 0 | 0 |
| 0 | 0 | 0.6548 | 2.6191 | 2.6191 | 0.6548 | 0 | 0 |
| 0 | 0 | −0.0225 | −0.0901 | −0.0901 | −0.0225 | 0 | 0 |
| 0 | 0 | 0.0576 | 0.2304 | 0.2304 | 0.0576 | 0 | 0 |
| 0 | 0 | 0.0118 | 0.0473 | 0.0473 | 0.0118 | 0 | 0 |
| 0 | 0 | −0.0024 | −0.0097 | −0.0097 | −0.0024 | 0 | 0 |
| 0 | 0 | 0.0317 | 0.1268 | 0.1268 | 0.0317 | 0 | 0 |

Matrix DiffM

| 0 | 0 | 0.2503 | 1.0012 | 1.0012 | 0.2503 | 0 | 0 |
|---|---|---|---|---|---|---|---|
| 0 | 0 | −0.0306 | −0.1222 | −0.1222 | −0.0306 | 0 | 0 |
| 0 | 0 | 0.1127 | 0.4508 | 0.4508 | 0.1127 | 0 | 0 |
| 0 | 0 | 0.0448 | 0.1791 | 0.1791 | 0.0448 | 0 | 0 |
| 0 | 0 | 0.0508 | 0.2033 | 0.2033 | 0.0508 | 0 | 0 |
| 0 | 0 | 0.0507 | 0.2028 | 0.2028 | 0.0507 | 0 | 0 |
| 0 | 0 | 0.0505 | 0.2018 | 0.2018 | 0.0505 | 0 | 0 |
| 0 | 0 | 0.1785 | 0.7138 | 0.7138 | 0.1785 | 0 | 0 |
| 0 | 0 | −0.2956 | −1.1822 | −1.1822 | −0.2956 | 0 | 0 |
| 0 | 0 | −0.0984 | −0.3936 | −0.3936 | −0.0984 | 0 | 0 |
| 0 | 0 | 0.2037 | 0.8147 | 0.8147 | 0.2037 | 0 | 0 |
| 0 | 0 | −0.1647 | −0.6589 | −0.6589 | −0.1647 | 0 | 0 |

Matrix AbsDiffM

| 0 | 0 | 0.2503 | 1.0012 | 1.0012 | 0.2503 | 0 | 0 |
|---|---|---|---|---|---|---|---|
| 0 | 0 | 0.0306 | 0.1222 | 0.1222 | 0.0306 | 0 | 0 |
| 0 | 0 | 0.1127 | 0.4508 | 0.4508 | 0.1127 | 0 | 0 |
| 0 | 0 | 0.0448 | 0.1791 | 0.1791 | 0.0448 | 0 | 0 |
| 0 | 0 | 0.0508 | 0.2033 | 0.2033 | 0.0508 | 0 | 0 |
| 0 | 0 | 0.0507 | 0.2028 | 0.2028 | 0.0507 | 0 | 0 |
| 0 | 0 | 0.0505 | 0.2018 | 0.2018 | 0.0505 | 0 | 0 |
| 0 | 0 | 0.1785 | 0.7138 | 0.7138 | 0.1785 | 0 | 0 |
| 0 | 0 | 0.2956 | 1.1822 | 1.1822 | 0.2956 | 0 | 0 |
| 0 | 0 | 0.0984 | 0.3936 | 0.3936 | 0.0984 | 0 | 0 |
| 0 | 0 | 0.2037 | 0.8147 | 0.8147 | 0.2037 | 0 | 0 |
| 0 | 0 | 0.1647 | 0.6589 | 0.6589 | 0.1647 | 0 | 0 |

Vector noiseProfEst

[ 0  0  1.5311  6.1246  6.1246  1.5311  0  0 ]

Vector noiseProfUnit

[ 0  0  0.1715  0.6860  0.6860  0.1715  0  0 ]

Vector noiseCor

[1.3462  −0.0665  0.4861  2.1122  4.1122  4.1122  4.1122  0.9092  −1.3875  −0.5048  1.1735  −0.7756]

Vector noiseCorBaseline

[0.1786  0.0760  −0.0396  1.9033  3.8751  3.8757  3.8768  0.0767  −0.0088  −0.0458  0.2234  −0.0072]

Vector noiseCorFilt

[1.1676  −0.1425  0.5258  0.2089  0.2371  0.2365  0.2354  0.8324  −1.3787  −0.4590  0.9501  −0.7684]

Matrix noiseEst

| 0 | 0 | 0.2002  | 0.8010  | 0.8010  | 0.2002  | 0 | 0 |
|---|---|---------|---------|---------|---------|---|---|
| 0 | 0 | −0.0244 | −0.0978 | −0.0978 | −0.0244 | 0 | 0 |
| 0 | 0 | 0.0902  | 0.3607  | 0.3607  | 0.0902  | 0 | 0 |
| 0 | 0 | 0.0358  | 0.1433  | 0.1433  | 0.0358  | 0 | 0 |
| 0 | 0 | 0.0407  | 0.1627  | 0.1627  | 0.0407  | 0 | 0 |
| 0 | 0 | 0.0406  | 0.1622  | 0.1622  | 0.0406  | 0 | 0 |
| 0 | 0 | 0.0404  | 0.1615  | 0.1615  | 0.0404  | 0 | 0 |
| 0 | 0 | 0.1428  | 0.5710  | 0.5710  | 0.1428  | 0 | 0 |
| 0 | 0 | −0.2364 | −0.9458 | −0.9458 | −0.2364 | 0 | 0 |
| 0 | 0 | −0.0787 | −0.3149 | −0.3149 | −0.0787 | 0 | 0 |
| 0 | 0 | 0.1629  | 0.6517  | 0.6517  | 0.1629  | 0 | 0 |
| 0 | 0 | −0.1318 | −0.5271 | −0.5271 | −0.1318 | 0 | 0 |

Matrix M1 (After Removing Direct Coupled Noise)

| 0 | 0 | 0.0306  | 0.1225  | 0.1225  | 0.0306  | 0 | 0 |
|---|---|---------|---------|---------|---------|---|---|
| 0 | 0 | 0.0130  | 0.0521  | 0.521   | 0.0130  | 0 | 0 |
| 0 | 0 | −0.0068 | −0.0272 | −0.0272 | −0.0068 | 0 | 0 |
| 0 | 0 | 0.3264  | 1.3056  | 1.3056  | 0.3264  | 0 | 0 |
| 0 | 0 | 0.6646  | 2.6583  | 2.6583  | 0.6646  | 0 | 0 |
| 0 | 0 | 0.6647  | 2.6587  | 2.6587  | 0.6647  | 0 | 0 |
| 0 | 0 | 0.6649  | 2.6595  | 2.6595  | 0.6649  | 0 | 0 |
| 0 | 0 | 0.0132  | 0.0526  | 0.0526  | 0.0132  | 0 | 0 |
| 0 | 0 | −0.0015 | −0.0060 | −0.0060 | −0.0015 | 0 | 0 |
| 0 | 0 | −0.0079 | −0.0314 | −0.0314 | −0.0079 | 0 | 0 |
| 0 | 0 | 0.0383  | 0.1533  | 0.1533  | 0.0383  | 0 | 0 |
| 0 | 0 | −0.0012 | −0.0050 | −0.0050 | −0.0012 | 0 | 0 |

What is claimed is:

1. A method, comprising:
   receiving data indicative of a contact between a touch object and a sensing device, the data comprising a first matrix of capacitance values associated with the sensing device and a second matrix of capacitance values associated with the sensing device, the capacitance values of the first and second matrices being obtained at different times during the contact;
   determining a difference between the first matrix of capacitance values and the second matrix of capacitance values;
   determining a noise vector based on the difference between the first and second matrices of capacitance values, wherein each element of the noise vector is a sum of a respective column of elements in the difference between the first and second matrices of capacitance values;
   determining a noise estimate matrix of direct coupled noise based on the noise vector determined using the difference between the first and second matrices of capacitance values associated with the sensing device, wherein each element of the noise estimate matrix corresponds to a respective first element of the first matrix of capacitance values and a respective second element of the second matrix of capacitance values, and both the respective first element and the respective second element are associated with a single respective capacitive sensing element of the sensing device; and
   adjusting the data to remove the direct coupled noise based on the noise estimate of the direct coupled noise.

2. The method of claim 1, further comprising:
   determining a correlation of the noise vector with at least one of the first or second matrices of capacitance values;
   high pass filtering the correlation to obtain a filtered correlation so as to remove steady correlated capacitance values caused by actual contact between the touch object and the sensing device; and
   determining the noise estimate matrix based on the filtered correlation.

3. The method of claim 1, wherein adjusting the data further comprises subtracting the noise estimate matrix from the data indicative of the contact.

4. An apparatus, comprising:
   a processing device configured to:
   receive data indicative of a contact between a touch object and a capacitive sense array, the data comprising a first matrix of capacitance values associated with the capacitive sense array and a second matrix of capacitance values associated with the capacitive sense array, the capacitance values of the first and second matrices being obtained at different times during the contact;

determine a difference between the first matrix of capacitance values and the second matrix of capacitance values;

determine a noise vector based on the difference between the first and second matrices of capacitance values, wherein each element of the noise vector is a sum of a respective column of elements in the difference between the first and second matrices of capacitance values;

determine a noise estimate matrix of direct coupled noise based on the noise vector determined using the difference between the first and second matrices of capacitance values associated with the sensing device, wherein each element of the noise estimate matrix corresponds to a respective first element of the first matrix of capacitance values and a respective second element of the second matrix of capacitance values, and both the respective first element and the respective second element are associated with a single respective capacitive sensing element of the sensing device; and adjust the data indicative of the contact to remove the direct coupled noise based on the noise estimate of the direct coupled noise.

5. The apparatus of claim 4, wherein the data indicative of the contact comprises two or more sets of capacitance values.

6. The apparatus of claim 4, wherein the processing device is further configured to:

determine a correlation of the noise vector with at least one of the first or second matrices of capacitance values;

high pass filter the correlation to obtain a filtered correlation so as to remove steady correlated capacitance values caused by actual contact between the touch object and the sensing device; and determine the noise estimate matrix based on the filtered correlation.

7. The apparatus of claim 4, wherein the processing device is further configured to adjust the data indicative of the contact between the touch object and the capacitive sense array by subtracting the noise estimate matrix from the data indicative of the contact.

8. A non-transitory machine readable storage medium including instructions that, when executed by a processing device, cause the processing device to perform operations comprising:

receiving data indicative of a contact between a touch object and a capacitive sense array, the data comprising a first matrix of capacitance values associated with the capacitive sense array and a second matrix of capacitance values associated with the capacitive sense array, the capacitance values of the first and second matrices being obtained at different times during the contact;

determining a difference between the first matrix of capacitance values and the second matrix of capacitance values;

determining a noise vector based on the difference between the first and second matrices of capacitance values, wherein each element of the noise vector is a sum of a respective column of elements in the difference between the first and second matrices of capacitance values;

determining a noise estimate matrix of direct coupled noise based on the noise vector determined using the difference between the first and second matrices of capacitance values associated with the sensing device, wherein each element of the noise estimate matrix corresponds to a respective first element of the first matrix of capacitance values and a respective second element of the second matrix of capacitance values, and both the respective first element and the respective second element are associated with a single respective capacitive sensing element of the sensing device; and adjusting the data indicative of the contact to remove the direct coupled noise based on the noise estimate of the direct coupled noise.

9. The non-transitory machine readable storage medium of claim 8, wherein the operations further comprise:

determining a correlation of the noise vector with at least one of the first or second matrices of capacitance values;

high pass filtering the correlation to obtain a filtered correlation so as to remove steady correlated capacitance values caused by actual contact between the touch object and the sensing device; and determining the noise estimate matrix based on the filtered correlation.

10. The method of claim 1, wherein the capacitance values of the first and second matrices are obtained at predetermined intervals of between approximately 10 milliseconds and 100 milliseconds.

11. The method of claim 1, wherein the capacitance values of the first and second matrices are averages of respective pluralities of capacitance values.

12. The method of claim 1, further comprising:

adjusting the data to remove direct coupled noise by using a third matrix of capacitance values associated with the sensing device, the capacitance values of the first, second and third matrices being obtained at different times during the contact.

13. The method of claim 2, wherein the filtered correlation is determined with reference to a baseline noise level that is updated based on the data indicative of the contact.

14. The method of claim 1, wherein determining the noise estimate matrix of direct coupled noise based on the noise vector further comprises:

after determining the noise vector, scaling the noise vector to a unit length; and determining a correlation of the noise vector between the first matrix of capacitance values and the scaled noise vector.

15. The apparatus of claim 6, wherein the filtered correlation is determined with reference to a baseline noise level that is updated based on the data indicative of the contact.

16. The apparatus of claim 4, wherein the processing device is configured to determine the noise estimate matrix of direct coupled noise based on the noise vector by:

after determining the noise vector, scaling the noise vector to a unit length; and determining a correlation of the noise vector between the first matrix of capacitance values and the scaled noise vector.

17. The non-transitory machine readable storage medium of claim 9, wherein the filtered correlation is determined with reference to a baseline noise level that is updated based on the data indicative of the contact.

18. The non-transitory machine readable storage medium of claim 8, wherein the operation of determining the noise estimate matrix of direct coupled noise based on the noise vector further comprises:
   after determining the noise vector, scaling the noise vector to a unit length; and
   determining a correlation of the noise vector between the first matrix of capacitance values and the scaled noise vector.

\* \* \* \* \*